(12) United States Patent
Brewer et al.

(10) Patent No.: US 10,451,090 B2
(45) Date of Patent: Oct. 22, 2019

(54) ADJUSTMENT SYSTEM FOR A HYDRAULIC ACTUATOR

(71) Applicant: Claverham Limited, Shirley, Solihull (GB)

(72) Inventors: Paul Brewer, Bristol (GB); Reg Raval, North Somerset (GB); Andrew Walton, Bristol (GB)

(73) Assignee: CLAVERHAM LIMITED, Shirley, Solihull (GB)

( * ) Notice: Subject to any disclaimer, the term of this patent is extended or adjusted under 35 U.S.C. 154(b) by 114 days.

(21) Appl. No.: 15/617,481

(22) Filed: Jun. 8, 2017

(65) Prior Publication Data

US 2018/0142711 A1    May 24, 2018

(30) Foreign Application Priority Data

Jun. 10, 2016 (EP) .................................. 16174011

(51) Int. Cl.
*F15B 13/12* (2006.01)
*F16H 21/44* (2006.01)
(Continued)

(52) U.S. Cl.
CPC ............ *F15B 13/12* (2013.01); *F15B 11/205* (2013.01); *F15B 13/0842* (2013.01); *F15B 13/0885* (2013.01); *F15B 18/00* (2013.01); *F15B 21/045* (2013.01); *F16H 21/44* (2013.01); *F16K 31/002* (2013.01); *F03G 7/065* (2013.01); *F15B 11/22* (2013.01); *F15B 2211/66* (2013.01)

(58) Field of Classification Search
CPC .......... F15B 13/12; F15B 11/20; F15B 11/22; F15B 21/045; F15B 2211/782
See application file for complete search history.

(56) References Cited

U.S. PATENT DOCUMENTS

| 3,613,732 A | 10/1971 | Willson et al. |
| 3,640,185 A | 2/1972 | Korsak |

(Continued)

FOREIGN PATENT DOCUMENTS

| DE | 1756755 A1 | 8/1970 |
| GB | 2119966 A | 11/1983 |
| GB | 2199966 A | 7/1988 |

OTHER PUBLICATIONS

European Search Report for Application No. 16174011.3-1754 dated Dec. 15, 2016, 8 pages.

*Primary Examiner* — Michael Leslie
*Assistant Examiner* — Daniel S Collins
(74) *Attorney, Agent, or Firm* — Cantor Colburn LLP

(57) ABSTRACT

The present disclosure relates to an adjustment system a method for compensating for temperature variations in a spool valve. The spool valve and adjustment system may be parts in a duplex hydraulic actuator. The adjustment device comprises a spring, a pivot point, and a shape memory alloy (SMA) device. The spring and SMA device are disposed on either side of the pivot point to hold the pivot point in a first position. The SMA device is configured to change size in response to a temperature change so as move the pivot point to a second location. This may eliminate force fight in the duplex hydraulic actuator by preventing asynchronous activation of the spool valves due to thermal expansion within the spool valves.

12 Claims, 3 Drawing Sheets

(51) Int. Cl.
  *F15B 11/20*   (2006.01)
  *F15B 13/08*   (2006.01)
  *F15B 21/045*  (2019.01)
  *F16K 31/00*   (2006.01)
  *F15B 18/00*   (2006.01)
  *F03G 7/06*    (2006.01)
  *F15B 11/22*   (2006.01)

(56) References Cited

U.S. PATENT DOCUMENTS

| | | | |
|---|---|---|---|
| 4,531,448 A | | 7/1985 | Barnes |
| 5,613,634 A | * | 3/1997 | Veronesi ............... G05D 23/026 |
| | | | 236/101 R |
| 5,671,651 A | * | 9/1997 | Pfaff ....................... B64C 13/42 |
| | | | 91/523 |
| 7,748,405 B2 | | 7/2010 | Ghorbal et al. |
| 7,992,795 B2 | | 8/2011 | Minor et al. |
| 8,356,792 B2 | * | 1/2013 | Grimseth ................ E21B 34/00 |
| | | | 251/11 |
| 9,212,754 B2 | | 12/2015 | Jackson, Jr. |
| 2013/0139906 A1 | * | 6/2013 | Neelakantan ........... F16K 11/07 |
| | | | 137/334 |

* cited by examiner

ADJUSTMENT SYSTEM FOR A HYDRAULIC ACTUATOR

FOREIGN PRIORITY

This application claims priority to European Patent Application No. 16174011.3 filed Jun. 10, 2016, the entire contents of which is incorporated herein by reference.

FIELD

The present disclosure relates to an adjustment system for a hydraulic actuator and a method of controlling a hydraulic actuator. The adjustment system may be a control system for a duplex hydraulic actuator having a common input lever.

BACKGROUND

A duplex hydraulic actuator system of the prior art may have two pistons disposed on the same output shaft. Each piston is associated with its own pair of chambers on either side of the piston. Each pair of chambers is controlled by a spool valve which is a valve that simultaneously connects one of the pair of chambers to an input fluid flow path and the other of the pair of chambers to an output fluid flow path. In this way, a pressure imbalance between the two chambers of a pair will push the associated piston in a first direction.

Both pistons should be actuated in the same direction at the same time. That is, both spool valves should be actuated simultaneously such that each spool valve directs fluid flow within the chambers such that both pistons are biased in the same direction. If the spool valves are not actuated simultaneously then one piston may be being biased in a first direction while the second piston may either be biased in the second direction (due to the other spool valve being open in the opposite direction) or be blocked (due to the other spool valve being closed)—this situation is called "force fight". Either situation may cause increased pressure in the piston chambers and its associated galleries within the actuator. This can damage these components or can require them to be made extra strong (and heavy) to account for the possibility of force fight.

SUMMARY OF INVENTION

According to a first aspect there is provided an adjustment system for adjusting a position of an actuator rod within a spool valve, the adjustment device comprising: a spring; a pivot point; and a shape memory alloy, SMA, device, wherein the spring and SMA device are disposed on either side of the pivot point to bias the pivot point to a first position, wherein the SMA device is configured to change size in response to a temperature change so as bias the pivot point to a second location.

In accordance with the aspect described above, the adjustment device may comprise a housing, wherein the spring abuts a first end of the housing and extends within the housing to the pivot point; wherein the SMA device abuts a second end of the housing and extends within the housing to the pivot point, and wherein the pivot point is movable relative to the housing.

In accordance with the aspect described above, there may be provided a spool valve and control system, wherein the control system comprises the adjustment device; and a lever pivotally connected to the pivot point of the adjustment device; wherein the lever is connected to an actuator rod of the spool valve, and wherein the SMA device is in thermal communication with the spool valve to adjust the pivot point of the lever based on a temperature of the spool valve.

In accordance with one or more of the above aspects, the adjustment system may be connected to the first end of the lever and the second end of the lever is connectable to an actuator shaft of a spool valve.

In accordance with one or more of the above aspects, the adjustment device may be connected to the second end of the lever and the second end of the lever is connectable to an actuator shaft of a spool valve.

In accordance with one or more of the above aspects, the shape memory alloy device may comprise a two-way shape memory alloy.

In accordance with one or more of the above aspects, the adjustment system may comprise a sensor configured to detect movement of the pivot point of the adjustment system.

In accordance with the above aspects, the sensor may be a microswitch indicator or a LVDT, wherein the sensor is mounted to a body comprising the pivot point and wherein the sensor is configured to detect movement of the body towards a mounting point of the SMA device or configured to detect movement of the body towards a mounting point of the spring.

In accordance with one or more of the above aspects, the spring may be selected from the group comprising a disc spring, a coil spring, a spring washer, a wave spring, and a leaf spring.

In accordance with the another aspect, there may be provided a control system for a duplex hydraulic system comprising: a first spool valve and a second spool valve; a summing lever system comprising a common input lever, a first summing levers, and a second summing lever; wherein the first spool valve is connected to the first summing lever and the second spool valve is connected to the second summing lever; and an adjustment device according to the first aspect attached to an end of the first summing lever and in thermal communication with the first spool valve; and an adjustment device according to any of the above aspects attached to an end of the second summing lever and in thermal communication with the second spool valve.

In accordance with another aspect, there may be provided a control system for a duplex hydraulic system comprising: a first spool valve and a second spool valve; a summing lever system comprising a common input lever, a first summing lever, and a second summing lever; wherein the first spool valve is connected to the first summing lever and the second spool valve is connected to the second summing lever; and an adjustment system according to any of the first aspects attached to an end of the first summing lever and in thermal communication with the first spool valve; and an adjustment system according to any of the first aspects attached to an end of the second summing lever and in thermal communication with the second spool valve.

In another aspect, the present disclosure may provide a method of compensating for thermal effects in a control system, the method comprising: providing a lever having a first pivot point at a first end and a second pivot point at a second end, wherein the first pivot point and second pivot point allow rotation of the lever in a plane, attaching the first end of the lever to a spool valve, attaching an adjustment system comprising a shape memory alloy device to a pivot point of the lever, translating the pivot point attached to the adjustment system in the plane in response to a temperature experienced by the adjustment system.

The method according to the above aspect may comprise detecting a translation of the pivot point using a sensor.

The method according to the above aspect may comprise outputting a signal to an operator when translation of the pivot point is detected.

In another aspect, the present disclosure may provide a method of preventing force fight in a duplex hydraulic system, wherein the duplex hydraulic system comprises a summing lever system comprising a common input lever and first summing lever and a second summing lever; and a first and second spool valves; the method comprising: mounting the first summing lever to a pivot point at a first end and a second pivot point at a second end, wherein the first pivot point and second pivot point allow rotation of the first summing lever in a plane, mounting the second summing lever to a pivot point at a first end and a second pivot point at a second end, wherein the first pivot point and second pivot point allow rotation of the second summing lever in the plane, attaching the first summing lever to the first spool valve; attaching the second summing lever to the second spool valve; attaching a first adjustment system comprising a shape memory alloy device to a pivot point of the first summing lever wherein the first adjustment system is in thermal communication with the first spool valve; attaching a second adjustment system comprising a shape memory alloy device to a pivot point of the second summing lever, wherein the second adjustment system is in thermal communication with the second spool valve; and for each summing lever, translating the pivot point attached to the adjustment system in the plane in response to a temperature experienced by each adjustment system.

The method according to the above aspect may comprise the steps of detecting movement of the first pivot point with a first sensor; detecting movement of the second pivot point with a second sensor; and outputting one or more signals to an operator, wherein the signals are based on the detected movement of one or more of the pivot points.

DESCRIPTION OF THE FIGURES

Certain embodiments of the present disclosure will now be described in greater detail by way of example only and with reference to the accompanying drawings in which.

DETAILED DESCRIPTION

Figure 1:
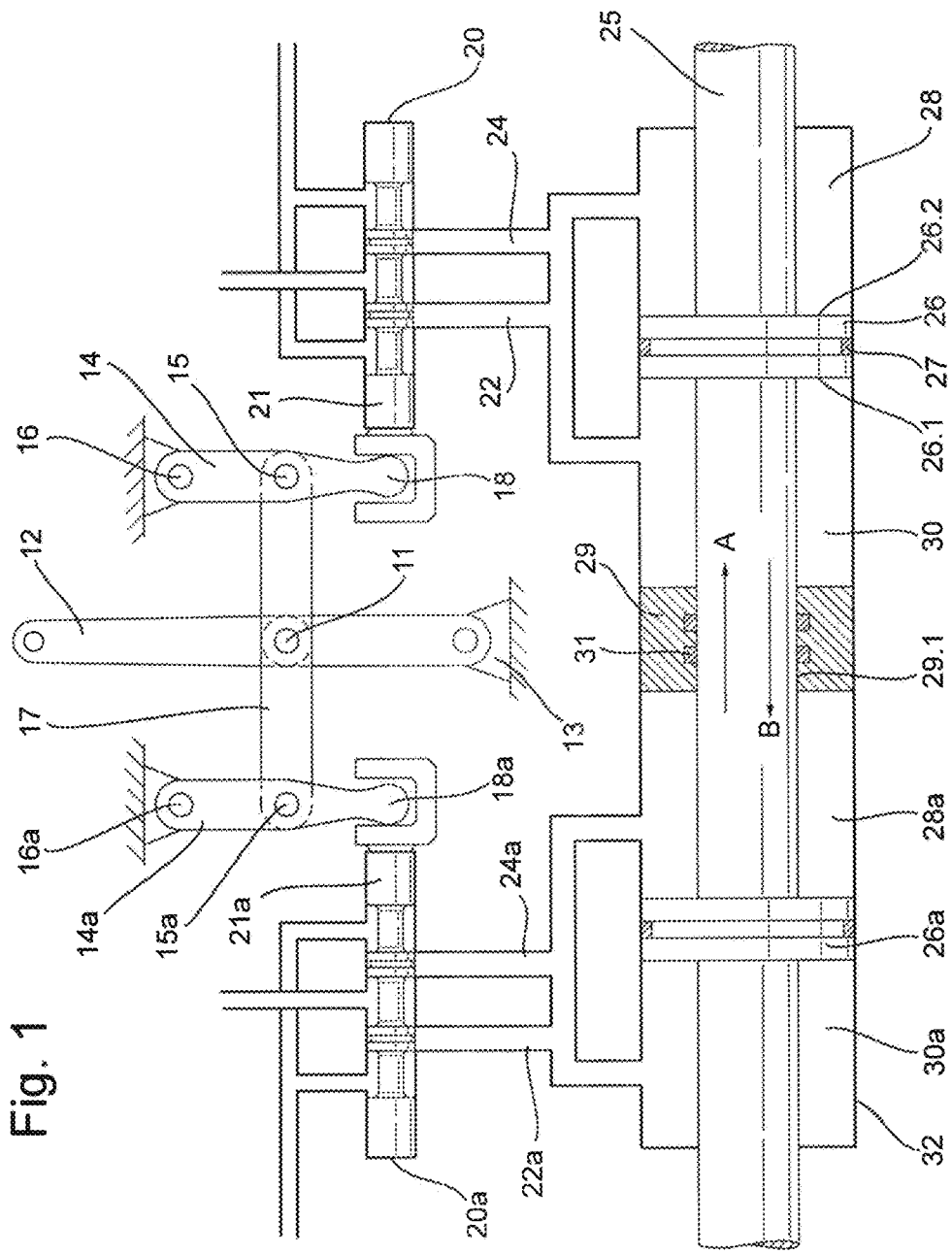
FIG. 1 shows a side view of a known duplex hydraulic system.

A known duplex hydraulic system 1 is shown in FIG. 1. This duplex hydraulic system 1 has first 10 and second 10a hydraulic systems that are driven synchronously by a single common input lever 12. Components related to one of the hydraulic systems 10a that are equivalent to components of the other hydraulic system will have the same reference signs but suffixed with "a".

One end of the common input lever 12 is fixed to a pivot point 13 around which the common input lever may pivot in a plane 2.

A mid-point of a cross bar 17 is connected to a mid-point of the common input lever 12. The connection 11 of the cross bar 17 and the common input lever 12 is a rotatable connection such that the cross bar 17 may rotate in the plane 2 relative to the common input lever 12.

Each end of the cross bar 17 is connected to a summing lever 14, 14a associated with a respective one of the first 10 and second 10a hydraulic systems. The connection 15, 15a of the cross bar 17 to the summing lever 14, 14a is a rotatable connection such that the summing levers 14, 14a may each rotate in the plane 2 relative to the cross bar 17.

One end of a given summing lever 14, 14a is connected to a pivot point 16, 16a around which that summing lever 14, 14a may pivot within the plane 2.

The above described summing lever system, comprising a common input lever 12, cross bar 17, and two summing levers 14, are known in the art. If the summing levers 14, 14a are of identical length, and if cross bar 17 is connected to each summing lever 14, 14a at the same distance from that summing lever's pivot point 16, 16a, then free ends 18, 18a of both summing levers 14, 14a will move simultaneously by equal amounts in the first direction.

The description will now focus on the first hydraulic system 10. The second hydraulic system 10a may comprise the same components.

The free end 18 of the summing lever 14 is connected to an actuator shaft 21 of a spool valve 20. When the free end 18 moves in a first direction (by movement of the common input lever 12), then the actuator shaft 21 is translated in the plane 2 so as to allow hydraulic fluid under positive pressure (e.g. from a pump) to flow through the spool valve 20 into a first path 22 that connects the spool valve 20 to a piston chamber 30 within a main actuator cylinder 32.

Due to the summing lever system, the actuator shaft 21a of the spool valve 20a of the second hydraulic system 10a may be moved in the plane 2 simultaneously with the actuator shaft 20 of the first hydraulic system 10. This may cause fluid to flow through a path 22a connecting the spool valve 20a of the second hydraulic system 10a to a second piston chamber 30a within the main actuation cylinder 32.

The first piston chamber 30 is defined by a barrier 29 within the main actuation cylinder 32, inner walls of the main actuation cylinder 32, and a movable piston 26 that is connected to the output shaft 25 of the main actuation cylinder 32. A suitable sealing design (such as an O-ring) 27 is disposed on the movable piston 26 to seal between the movable piston 26 and the walls of the piston chamber 30.

Pressure induced by the fluid flow from the first path 22 into the piston chamber 30 applies a force to a first side 26.1 of the movable piston 26. Simultaneous with the opening of the first path 22, a return path 24 through the spool valve 20 may be opened. The return path 24 allows fluid to flow from a second chamber 28 through the spool valve 20. The spool valve 20 and associated piping for providing the first path 22 and the return path 24 may be referred to generally as the spool assembly block.

The second chamber 28 is defined in the main actuation cylinder 32 and located on the opposite side of the movable piston 26 from the first chamber 30. That is, the second chamber 28 is defined by a second side 26.2 of the movable piston 26 and by the inner walls of the main actuation cylinder 32. Fluid can therefore freely flow out of the second chamber 28 and through the spool valve 20, or can be drawn out of the chamber 28 by negative pressure (e.g. from the pump or from a second pump). Thus, the unbalanced forces on the first 26.1 and second 26.2 sides of the movable piston 26 seek to move the output shaft 25 in a first direction A relative to the main actuator cylinder 32.

The second spool valve 20a behaves in substantially the same manner as described above. That is, actuation of the second spool valve 20a allows fluid to flow through a first path 22a into a first chamber 30a defined in the main actuation cylinder 32 and to press against a first side 26.1a of a second movable piston 26a that is connected to the output shaft 25. Simultaneously, fluid may flow out from a chamber 28a on the second side 26.2a of the movable piston 26a, possibly under negative pressure from the or a pump. A chamber 30 of the first hydraulic system 10 and a chamber 28a of the second hydraulic system 10a are separated by the barrier 29. The output shaft 25 extends through a hole 29.1 in the barrier 29. One or more O-rings 31 are provided in the hole 29.1 to prevent fluid flow between the two chambers 28a, 30.

As described above, both hydraulic systems 10, 10a can be actuated simultaneously by movement of the common input lever. Movement of the common input lever in a first direction actuates each spool valve 20, 20a, so as to allow fluid flow into/out of the relevant chambers 28, 28a, 30, 30a which act together to bias the output shaft 25 to move in a first direction A. The hydraulic systems 10, 10a may be provided with a single common pump that connects to both spool valves 20, 20a. Alternatively, each hydraulic system 10, 10a may be provided with its own separate pump or pumps.

The first and second hydraulic systems 10, 10a may be disposed on the outside of the main actuation cylinder 32. The first and second hydraulic systems 10, 10a may be in thermal communication with the hydraulic fluid within the main actuation cylinder 32 and may be in thermal communication with the environment around the main actuation cylinder 32. If the duplex hydraulic system 1 is on an aircraft, then the working temperatures can drop below −40° C. or rise above +110° C. This temperature variation causes thermal expansion or contraction of the components of the duplex hydraulic system 1.

If the spool valves are actuated out of synchrony, in particular, if one spool valve 20 is actuated so as to force the first movable piston 26 in one direction A and the second spool valve 20a is actuated so as to force the second movable piston 26a in the opposite direction B, then the two systems engage in "force fight". Force fight can damage the spool valves 20, 20a and their associated piping (e.g. first and second path 22, 24, 22a, 24a).

Force fight due to lack of synchronisation between the two summing levers 14, 14a (and consequently, between the two spool valves 20, 20a) can result from at least two causes. The first cause is backlash due to manufacturing tolerances of the levers 12, 17, 14, 14a, and their joints and pivot points 11, 13, 15, 15a. The second cause is thermal effects acting on the system 1 during operation. Improving manufacturing tolerances in the system may reduce the possibility of force fight from the first cause, but thermal effects may be harder to compensate for in the known duplex hydraulic system of FIG. 1.

The present disclosure provides an adjustment system 100 that may reduce force fight caused by thermal effects. Two exemplary adjustment systems 100 will now be described, the first with reference to FIGS. 2A and 2B and the second with reference to FIG. 3.

FIG. 2A shows a first and second adjustment system 100, 100a as a modification to the prior art duplex hydraulic system 1 described above. FIG. 2B shows a section view of an adjustment device 100, 100a.

An adjustment system 100 may be provided at one end of the first summing lever 14, 14a.

In this first embodiment, adjustment systems 100 replace the pivot points 16, 16a of the summing levers 14, 14a of the prior art device. The free ends 18, 18a of each summing lever 14, 14a are connected to the actuator shafts 21, 21a of the spool valves 20, 20a in the manner described above.

Figure 2:
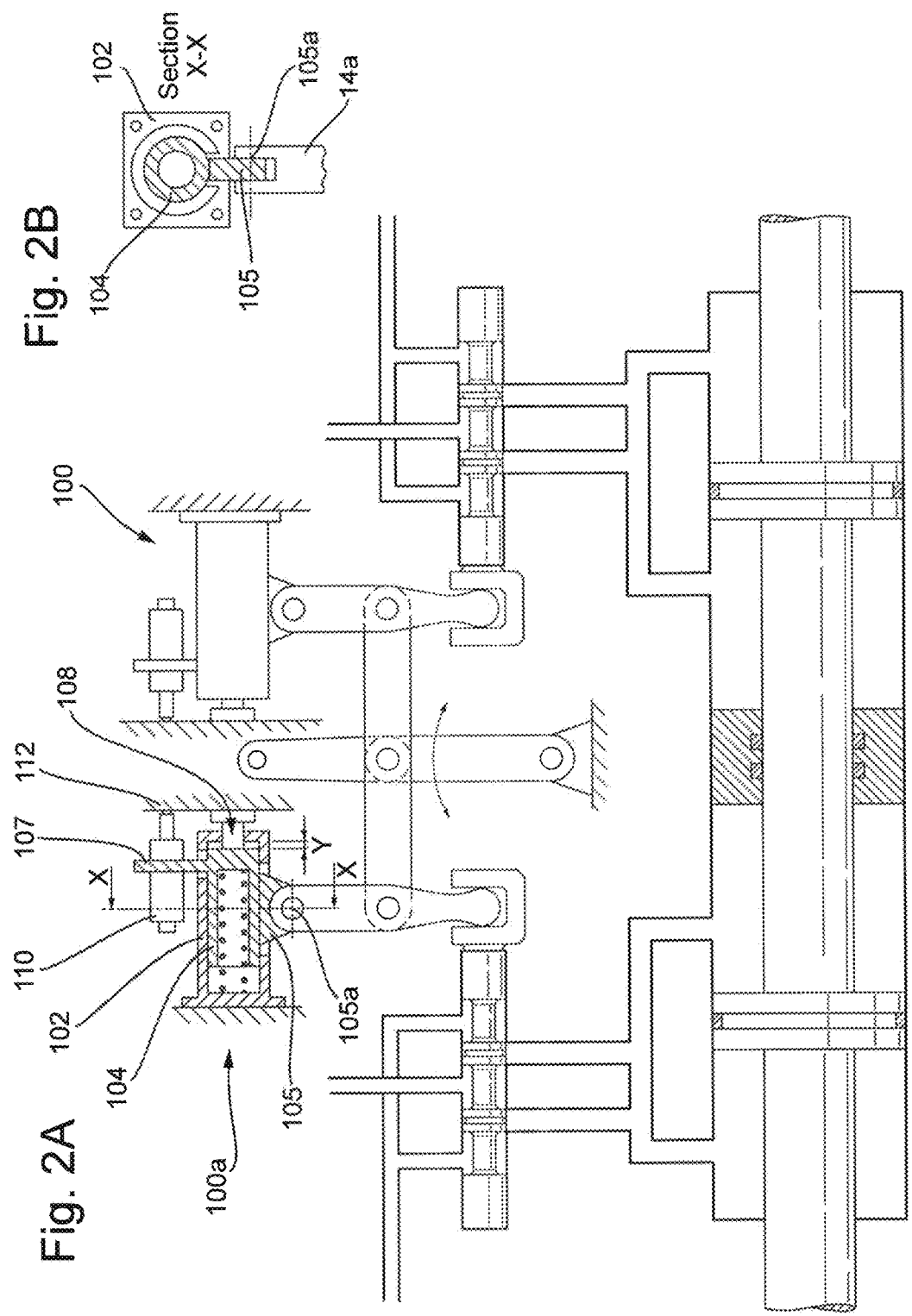
FIG. 2A shows a side view of a first exemplary duplex hydraulic system according to the present disclosure.
FIG. 2B shows a section of an exemplary adjustment system across line X-X of FIG. 2A.

As shown in FIG. 2, each hydraulic system 10, 10a may have an associated adjustment system 100. The adjustment systems 100 may be of identical construction and so only one adjustment system 100 will be hereafter described in detail.

The adjustment system 100 may linearly translate the pivot point 105a of the summing lever 14 within the plane 2.

The adjustment device 100 may comprise a housing 102 that is fixed against movement. For example, the adjustment device 100 may be fixed to the main actuation cylinder 32 or to an airframe (not shown) to which the main actuation cylinder 32 is also attached. The attachment points of the device 100 are schematically shown as "walls" 112.

A spring 106 may be disposed inside the housing 102 and is oriented along an axis C, which is an axis defined in the plane 2. Axis C defines the direction of translation allowed by the adjustment device 100. In one non-limiting example, axis C is parallel to the long axis of the cross-bar 17, which may also be parallel to the axis of motion of the spool valve 20 actuator shaft 21.

One end of the spring 106 may abut an inner wall of the housing 102 and the other end of the spring 106 may abut a piston 104. The piston 104 may be movable within the housing 102 along axis C. The spring 106 may have a natural length such that it is in compression between the housing 102 and the piston 104 at all locations within the range of motion of piston 104.

The piston 104 may have a first protrusion 105 that extends beyond the housing 102 for providing a pivot point 105a for the summing lever 14. By way of non-limiting example, the pivot point 105a may be part of a clevis fastener, as shown in section in FIG. 2B, for fastening the summing lever 14 to the adjustment device 100.

The piston 104 may have a second protrusion 107 extending through the housing 102. A sensor 110 may be mounted to the second protrusion 107 for sensing a position of the piston 104 within the housing 102. As shown in FIG. 2, the sensor 110 may be a micro switch having a sensing button that abuts one of the walls 112 to which the housing 102 is mounted. This microswitch is only actuated in the event that the piston is moved along axis C to the full possible extent allowed by the housing, as described below. Alternatively or additionally, the sensor 110 could be an LVDT sensor having a sensing probe for sensing a distance to a wall 112, or any other kind of suitable distance sensor or activation sensor known in the art. Alternatively or additionally, the sensor 110 may be mounted to the first protrusion 105.

The first 105 and second 107 protrusions that extend through the housing 102 have a range of motion that may be limited by the size of the hole in the housing through which they extend. The range of movement available to the piston 104, within the fixed housing 102, is denoted as distance y. Distance y is the maximum linear distance through which the movable pivot point 105a of the summing lever 14 may be moved by the adjustment device 100.

A shape memory alloy (SMA) device 108 may be disposed in the housing 102. One end of the SMA device 108 may be fixed to one end of the housing, or to another fixed point such as the main actuator cylinder 32 or an airframe or one of the walls 112. The other end of the SMA device may abut the piston 104 on a side opposite the spring 106.

A shape memory alloy is an alloy that "remembers" its original shape and, after having been mechanically deformed, will return to its original shape when heated. A SMA device 108 therefore, may act as a temperature-dependent actuator within the adjustment device. The SMA device may be formed from a two-way SMA. A two-way SMA is an alloy that "remembers" two different shapes, one at low temperatures and one at high temperatures. As one non-limiting example, a two-way SMA device that was formed into a straight rod at cold temperature may be bent into a horseshoe shape at cold temperature. Upon heating the bent rod, this exemplary SMA device will return (at least partially) to its original straight rod shape. If the (partially) straightened rod is then cooled again, it will return (at least partially) to its horseshoe shape. Repeated heating and cooling cycles may therefore cause the exemplary two-way SMA device to oscillate between the straight and horseshoe configurations.

As described above, the spring 106 is in compression and thus, in the example shown in FIG. 2, pushes the piston 104 in the direction of axis C. The SMA device 108, located on the opposing side of the piston 104, opposes the extension of the spring 106. The SMA device 108 and spring 104 are calibrated such that the piston 104 is normally held at a mid-point within its available range of motion x.

The SMA device 108 may be in thermal communication with the hydraulic fluid in the spool valve 20 and/or with the atmosphere around the duplex hydraulic system 10.

When a spool valve 20 heats up, thermal expansion of the different components of the spool valve 20 can cause relative movement of the internal components of the spool valve 20. This can cause fluid flow paths within the spool valve 20 to change without movement of the summing lever 14. That is to say, if the summing lever 14 is held in a fixed position then it may be that, at cooler temperatures, fluid flows in a first direction along a first path 22 through the spool valve 20, but at higher temperatures, the fluid flows in the opposite direction along the first path 22, or is blocked by the spool valve 20.

Different materials may have different rates of thermal expansion. As one non-limiting example, a change of temperature from −40° C. to +110° C. in a spool valve body housing made of aluminium alloy may cause the actuator shaft 21 to shift position by 50 microns (0.002 inch) within the spool valve 20. With tight manufacturing tolerances, this shift of 50 microns may be sufficient to increase the resultant chamber pressures within the actuator.

When the SMA device 108 is heated up via this thermal communication, the SMA device 108 will change its size and move the piston 104 against the force of the spring 106 to a new equilibrium position. This may shift the movable pivot point 105a of the summing lever 14. This shift may cause the summing lever 14 to pivot about its connection with the cross-bar 17 and, without any movement of the common input lever 12, the position of the actuator shaft 21 within the spool valve 20 may be changed.

Continuing from the non-limiting example above, the SMA device 108 may be calibrated (in particular with reference to the temperature change and the length of the summing lever 14) such that a temperature change from −40° C. to +110° C. moves the pivot point 105a a distance sufficient to cause the free end 18 of the summing lever 14 to shift the position of the actuator shaft 21 by 50 microns (0.002 inch) within the spool valve 20. That is to say, the movement of the pivot point 105a caused by heating the SMA device 100 may be calibrated so as to counteract the thermally-induced movement of the actuator shaft 21 within the spool valve 20.

In the prior art device 10 shown in FIG. 1, a temperature change difference between the two spool valves 20, 20a could cause force fight. That is, fluid flow in through one spool valve 20 may bias the output shaft in the direction A, while fluid flow in through the other spool valve 20a may bias the output shaft 25 in the opposing direction B or block motion of the output shaft 25.

In the system 100 of the present disclosure, the position of an actuation shaft 21 may be varied in response to a change of temperature in its spool valve 20, by heating the SMA device 108 to change the position of the summing lever 14 that actuates the actuation shaft 21. This may compensate for temperature changes in the spool valve 20 that would otherwise cause fluid to flow incorrectly through the spool valve 20.

Figure 3:
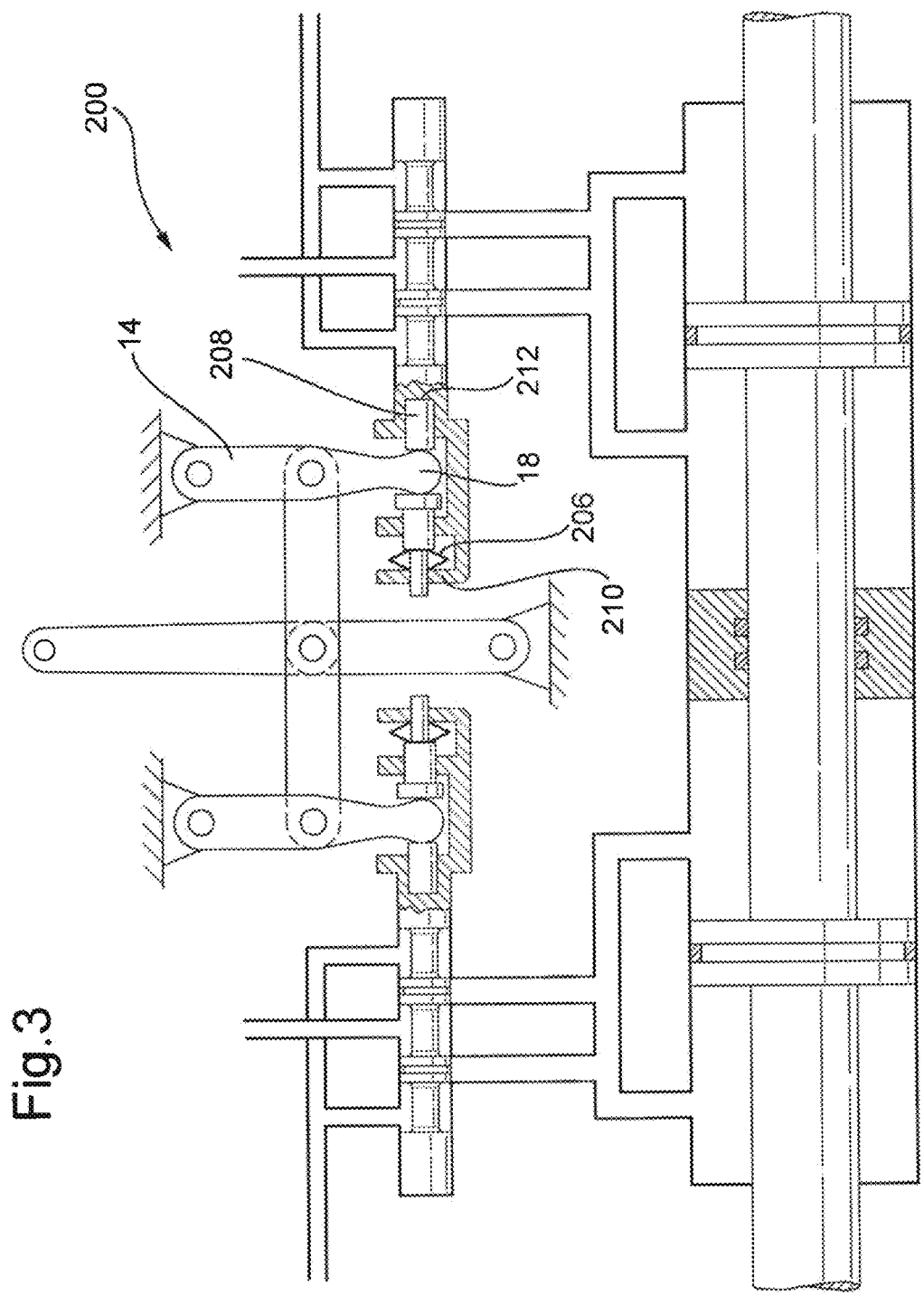
FIG. 3 shows a side view of a second exemplary duplex hydraulic system according to the present disclosure.

In another exemplary system, shown in FIG. 3, the adjustment device 200 is located at the free end 18 of the summing lever 14. In this example, the summing lever 14 is connected to a fixed pivot point 16, as in the prior art device of FIG. 1.

The adjustment device 200 comprises a spring 206 having one end abutting a portion 210 of the actuator shaft 21 and the other end abutting the free end 18 of the summing lever 14. A SMA device 208 may be disposed between the free end 18 of the summing lever 14 and another portion 212 of the actuator shaft. The spring 206 and SMA device 208 may be disposed on opposing sides of the free end 18 of the summing lever 14.

Similar to the adjustment device 100 of the first example, heating of the SMA device 208 may cause it to change size. This change of size may act in concert with the spring 206 to translate the actuator shaft 21 within the spool valve 20 without any corresponding movement of the free end 18 of the adjustment lever 14. That is, the connection point 18 of the summing lever 14 may shift in the plane 2 relative to the actuator shaft 21. This movement may be calibrated against the known thermal expansion characteristics of the spool valve.

An adjustment device 100, 200 may be disposed on each hydraulic system 10, 10a. Each adjustment device 100, 200 may react to local temperatures (which local temperatures are shared with their respective spool valve 20, 20a). Thus, thermally-induced force fight, caused by the first hydraulic system 10 driving the main actuator output shaft 25 in a first direction (e.g. direction A) while the second hydraulic system 10a drives the main actuator output shaft 25 in the opposite direction (e.g. direction B), may be reduced or eliminated by providing an adjustment device 100, 200 in each hydraulic system 10, 10a.

If force fight is substantially eliminated in this way, then it may be possible to construct the spool valves 20, 20a and associated piping from other materials. In the prior art systems such as the one described with reference to FIG. 1, it is desirable to construct the main actuator 32 and the hydraulic systems 10, 10a of the same material to avoid differential thermal expansion, which can exacerbate thermally-induced force fight.

By way of non-limiting example, the spool assembly block could be made of a lighter-weight material, such as aluminium alloy, while the main cylinder 32 is made of steel. This may result in weight savings in the actuator. For example, constructing the spool assembly block from aluminium alloy could result in an approximate ⅓ weight-saving for these components compared to using steel.

The adjustment devices 100, 200 of the present disclosure may be used in other hydraulic systems. For example, the hydraulic actuator 1 may have a single hydraulic system 10. In this example system, there is no need for synchronisation of two spool valves 20, 20a. In this example, the adjustment device 100, 200 may be provided to compensate for thermal variation in the spool valve 20 without having to move the lever that controls actuator shaft 21 of the spool valve.

The invention claimed is:

1. An adjustment system for adjusting a position of an actuator shaft within a spool valve, the adjustment device comprising:
   a spring;
   a pivot point; and
   a shape memory alloy (SMA) device,
   wherein the spring and the SMA device are disposed on either side of the pivot point to bias the pivot point to a first location,
   wherein the SMA device is configured to change size in response to a temperature change so as bias the pivot point to a second location.

2. The adjustment system of claim 1 comprising a housing,
   wherein the spring abuts a first end of the housing and extends within the housing to the pivot point;
   wherein the SMA device abuts a second end of the housing and extends within the housing to the pivot point, and
   wherein the pivot point is movable relative to the housing.

3. The adjustment system of claim 1 wherein the adjustment device is connected to a first end of a lever and a second end of the lever is connectable to an actuator shaft of a spool valve.

4. The adjustment system of claim 1 wherein the adjustment device is connected to a second end of a lever and a second end of the lever is connectable to an actuator shaft of a spool valve.

5. The adjustment system of claim 1 wherein the shape memory alloy device comprises a two-way shape memory alloy.

6. The adjustment system of claim 1 comprising a sensor configured to detect movement of the pivot point of the adjustment system.

7. The adjustment system of claim 6 wherein the sensor is a microswitch indicator or a LVDT, wherein the sensor is mounted to a body comprising the pivot point and wherein the sensor is configured to detect movement of the body towards a mounting point of the SMA device or configured to detect movement of the body towards a mounting point of the spring.

8. The adjustment system of claim 1 wherein the spring selected is from a group comprising a disc spring, a coil spring, a spring washer, a wave spring, and a leaf spring.

9. A spool valve and control system, wherein the control system comprises
   the adjustment system of claim 1; and
   a lever pivotally connected to the pivot point of the adjustment system;
   wherein the lever is connected to an actuator shaft of the spool valve, and
   wherein the SMA device is in thermal communication with the spool valve to adjust the pivot point of the lever based on a temperature of the spool valve.

10. A control system for a duplex hydraulic system comprising:
    a first spool valve and a second spool valve;
    a summing lever system comprising a common input lever, a first summing lever, and a second summing lever;
    wherein the first spool valve is connected to the first summing lever and the second spool valve is connected to the second summing lever; and
    an adjustment system according to claim 1 attached to an end of the first summing lever and in thermal communication with the first spool valve; and
    an adjustment system according to claim 1, attached to an end of the second summing lever and in thermal communication with the second spool valve.

11. A method of preventing force fight in a duplex hydraulic system, wherein the duplex hydraulic system comprises
    a summing lever system comprising a common input lever and a first summing lever and a second summing lever; and a first and second spool valves;
    the method comprising:
    mounting the first summing lever to a pivot point at a first end and a second pivot point at a second end, wherein the first pivot point and second pivot point allow rotation of the first summing lever in a plane;
    mounting the second summing lever to a pivot point at a first end and a second pivot point at a second end, wherein the first pivot point and second pivot point allow rotation of the second summing lever in the plane;
    attaching the first summing lever to the first spool valve;
    attaching the second summing lever to the second spool valve;
    attaching a first adjustment system comprising a shape memory alloy device to a pivot point of the first summing lever wherein the first adjustment system is in thermal communication with the first spool valve;
    attaching a second adjustment system comprising a shape memory alloy device to a pivot point of the second summing lever, wherein the second adjustment system is in thermal communication with the second spool valve; and
    for each summing lever, translating the pivot point attached to the adjustment system in the plane in response to a temperature experienced by each adjustment system.

12. The method of preventing force fight in a duplex hydraulic system according to claim 11 comprising the steps of
    detecting movement of the first pivot point with a first sensor;
    detecting movement of the second pivot point with a second sensor; and
    outputting one or more signals to an operator, wherein the signals are based on the detected movement of one or more of the pivot points.

* * * * *